United States Patent [19]

Falavigna

[11] Patent Number: 4,971,223

[45] Date of Patent: Nov. 20, 1990

[54] AUTOMATIC FRIED FOOD DISPENSER

[75] Inventor: Valerio Falavigna, Milan, Italy

[73] Assignee: Kwik Chips Italia S.p.A., San Prospero, Italy

[21] Appl. No.: 236,939

[22] Filed: Aug. 26, 1988

[30] Foreign Application Priority Data

Feb. 13, 1987 [IT] Italy ................................ 19388 A/87

[51] Int. Cl.⁵ ............................................ G07F 11/00
[52] U.S. Cl. ................................... 221/150 A; 99/355; 99/357; 99/407
[58] Field of Search ........ 221/150 HC, 150 A, 150 R; 99/357, 355, 407, 403, 473, 474; 55/308, 318, 482, 515, 528

[56] References Cited

U.S. PATENT DOCUMENTS

| | | | |
|---|---|---|---|
| 3,685,432 | 8/1972 | Hoeberigs | 221/150 HC |
| 3,818,820 | 6/1974 | Harris et al. | 99/407 |
| 3,871,849 | 3/1975 | Smith et al. | 55/515 X |
| 4,505,194 | 3/1985 | Bishop et al. | 99/407 |
| 4,763,572 | 8/1988 | Kuehl | 99/474 X |
| 4,785,725 | 11/1988 | Tate et al. | 99/407 X |

FOREIGN PATENT DOCUMENTS 2593308 7/1987 France ...................... 221/150 HC Primary Examiner—David H. Bollinger
Attorney, Agent, or Firm—Cushman, Darby & Cushman

[57] ABSTRACT

The invention herein referred to pertains to an automatic fried food dispenser with a cooking fumes filter. The automatic dispenser consists of a cupboard-type frame which houses: a means of food preservation, a means of measuring out portions of food and feeding them into a frier, and a means of dispensing the fried food to the outside. Incorporated into the frame is a course along which the cooking fumes can pass which extends to cover, as a minimum, the area above the frier. Along the length of the course there is: a means of circulating the fumes, a means of filtering the fumes and a means of drawing down the moisture content of the fumes which is mounted on the filtering system according to the direction in which the fumes are circulating along the course, referred to above.

12 Claims, 2 Drawing Sheets

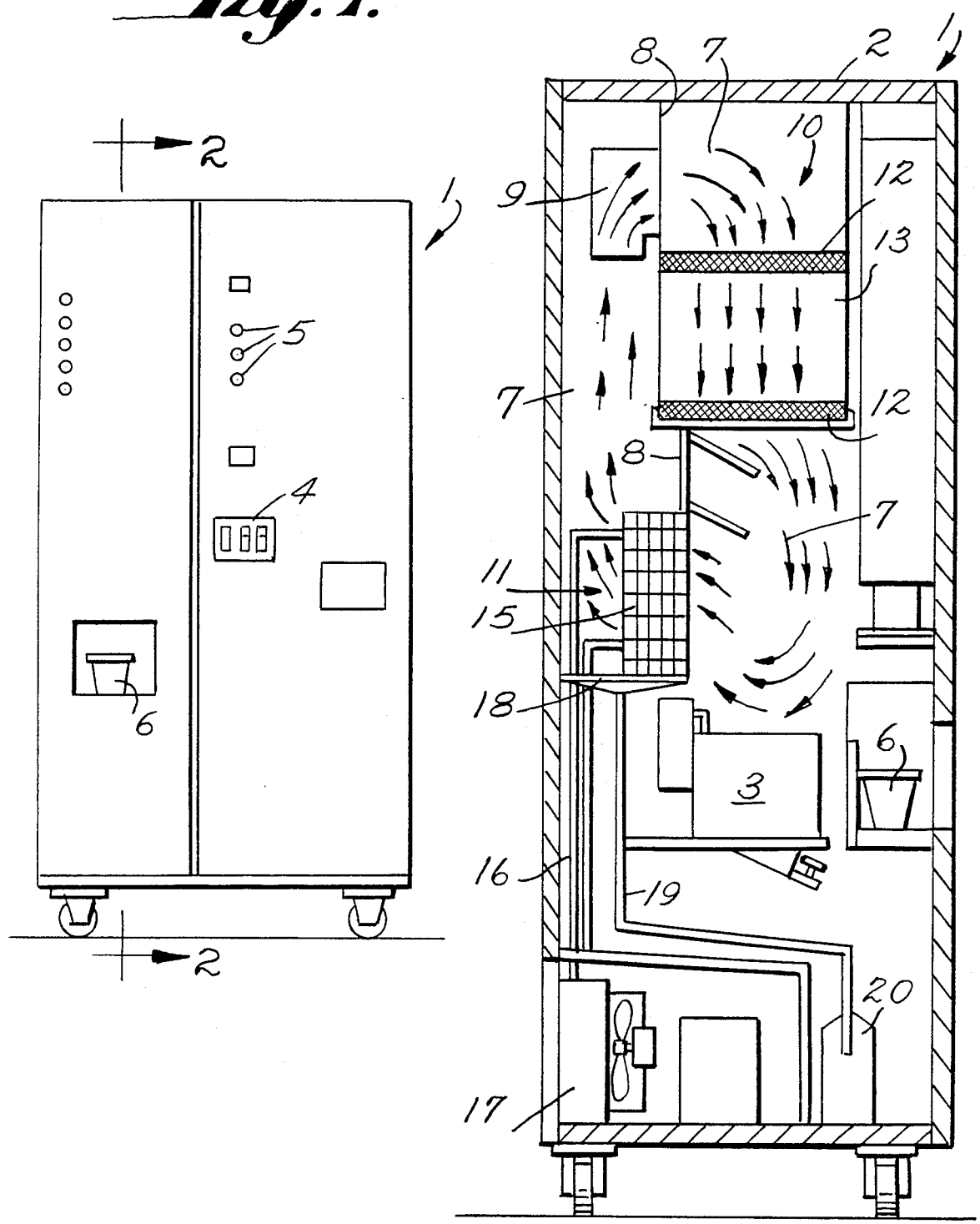

AUTOMATIC FRIED FOOD DISPENSER

DESCRIPTION

The invention herein referred to pertains to an automatic fried food dispenser with a cooking fumes filter. Noted are automatic fried food dispensers which consist of a cupboard-type frame housing a means of food preservation and a frier with oil kept at a pre-fixed temperature; the means of food preservation can consist either of simple containers, or, in the case of pre-cooked frozen food, a refrigerator, and there is a means for the automatic extraction of the food from the containers or the refrigerator which then feeds the food, in fixed portions, into the frier which is fitted with a small basket, or some other means of collecting up the food and dispensing it to the outside. The automatic means for the extraction of the food is activated by a taken-operated mechanism, which is also the means by which payment for the food is effected.

Given the fact that these automatic dispensers are mainly installed in enclosed spaces, it is necessary to provide a system for the purification or extraction of the cooking fumes. The simplest solution to this problem is the extraction of the fumes via a tube which leads to the outside, but this system entails the inconvenience of having to install the dispenser in an area close to windows or to a flue for the extraction of the fumes. If this location needs to be changed, it can be done only by altering the position of the fume-extraction tube, and, if this tube needs to extend over longer distances, there is the possibility of condensate collecting in the tube, which may necessitate the periodic maintenance of the tube in order to prevent the condensate form falling back into the automatic dispenser. Some types of automatic dispenser are fitted with a filter inside the cupboard-type frame and with a mechanism which circulates the fumes through the electrostatic or active charcoal filter. However, the continuous circulation of the fumes, which do have a certain moisture content, causes the collection of condensate in the filter which reduces its efficiency to the point of rendering it completely useless. These types of automatic dispensers with devices for the internal filtering of fumes, whilst avoiding the problem of having to be installed in particular locations, entail the inconvenience of needing frequent maintenance checks for the removal of the condensate from the filters and for the replacement of those parts of the filters which are irreparably damaged.

The objective of the present invention has been to find a solution to the inconveniences listed above, by the development of an automatic fried food dispenser with an effective system for the filtration of cooking fumes, requiring only a small number of maintenance checks and which can be installed in enclosed spaces.

A further objective behind the present invention has been to develop an automatic fried food dispenser which can be installed in enclosed spaces without having to have a cooking fumes extraction-tube leading to the outside.

This objective, along with other features which are explained in detail below, has been fulfilled by the development of an automatic fried food dispenser with a cooking fumes depurator, consisting of a cupboard-type frame containing: a means of food preservation, a means of measuring out portions and feeding them into a frier, and a means of dispensing the portions of fried foods to the outside, characterised by the fact that the said frame has incorporated into it a course along which the said cooking fumes can pass which extends to cover, as a minimum, the area above the said frier, and is fitted with a means of circulating the said fumes and a means of drawing down the moisture content of the said fumes, the said means of drawing down the moisture content of the said fumes being mounted on the said means of filtering according to the direction of circulation of the said fumes along the said.

Further characteristics and advantages will be further highlighted in the description of a preferential, but not exclusive, form of practice of the automatic dispenser, embodying the present invention, illustrated as an indication, however not restrictive, by the attached drawings in which:

FIG. 1 illustrates the automatic dispenser invention in the upright position, viewed from the front, FIG. 2 is a section of FIG. 1 along the line II -II:

Figure 3:
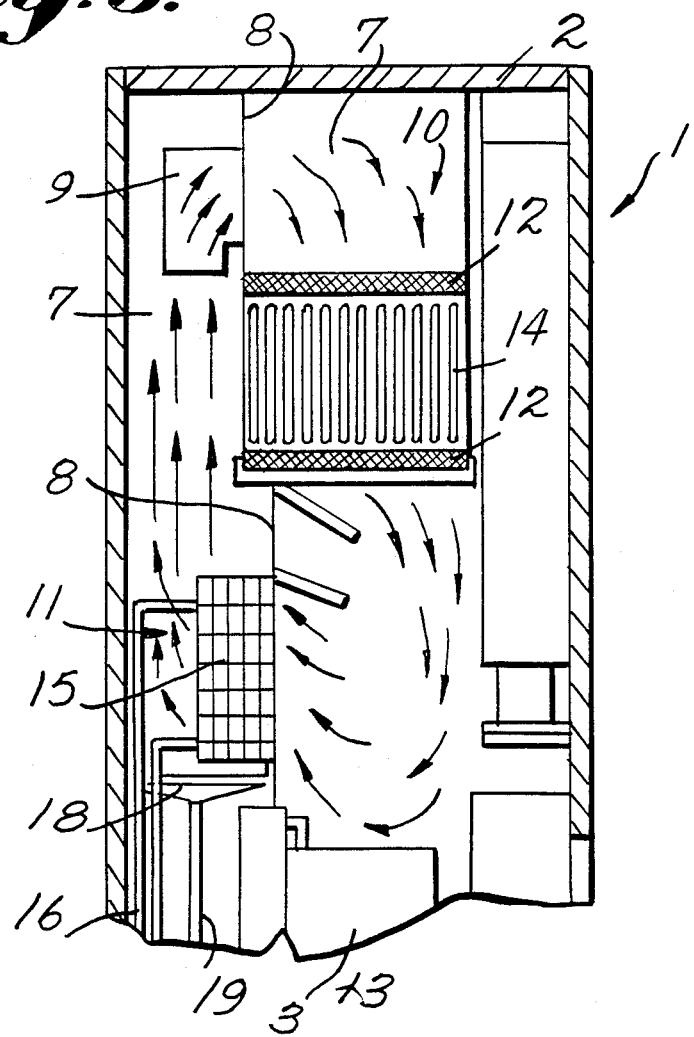
FIG. 3 is a similar section to FIG. 2 which illustrates a variation in the mode of operation of the invented means of filtering.

With reference to the diagrams listed above, the automatic dispenser invention, indicated in its totality with reference No.1, consists of a cupboard-type frame 2 which houses a known means of preservation of the food which is to be fried, which can consist of simple containers, or of a refrigerator when the food is pre-cooked and frozen, and a frier 3 with oil kept at the constant temperture best suited for good frying. Housed inside the frame 2 is a means of measuring out food portions and feeding them into the frier; the means of measuring out and feeding in the food portions are activated by a token-operated mechanism 4 or by another type of automatic payment device, and of a button 5 positioned on the front side of the cupboard-type frame. The frier 3 is fitted with a dispenser which extracts the fried food and dispenses it in the known way into the containers 6 which are accessible from the outside. As this is a token-operated mechanism, the means of measuring out and feeding in the portions of food, as well as the means of dispensing the fried food, are all, for the sake of simplicity, ommitted from the illustrations.

In this invention, the frame 2 is incorporated with a course 7 for the cooking fumes which extends to cover, as a minimum, the area above the frier; this course can be simply defined as extending from partition 8 to the connection with the frame 2, and fitted along the length of the course is a means of circulating the fumes 9, a means of filtering 10 and a means of drawing down the moisture content of the fumes 11. In more detail, the means of circulating the fumes 9 can be made up of a fan, indicated schematically in FIG. 2 and 3, whilst the means of filtering can be made up of a multi-layer filter, with layers 12 which enact the physical filtering of the fumes and with an active charcoal cartridge which enacts the chemical purification of the fumes, which can be replaced after a pre-fixed number of operating hours.

The means of filtering can also be made up of an electrostatic filter of known type as illustrated schematically in FIG. 3 and indicated with reference No. 14.

The means of drawing down the moisture content of the fumes are mounted on the means of filtering 10, according to the direction of circulation of the fumes.

A heat exchanger 15 cools the fumes down to a temperature below the condensation temperature of the moisture content of the fumes. For more advantageous results, the heat exchanger 15 can be made up of an evaporator with the appropriate type of finning, of a known type of refrigeration circuit 16 connected to a compressor 17 housed in the frame 2.

For more advantageous results, a condensate collector 18 is fitted to below the heat exchanger 15, which, via a tube 19, is connected to a condensate container 20 which is easily removable for emptying. The fumes purification system of the automatic dispenser functions as follows:

The activation of the fan 9 is linked to a pre-set temperature, fixed by the manufacturers, of the oil in the frier, and this causes the circulation of the fumes along the course 7, through the evaporator 15 and through the filter 10. The passage of the fumes through the evaporator 15 causes the condensation of the moisture content, which falls down into the condensate collector 18 and then into the condensate container 20. In this way the fumes which enter the filter 10 contain no moist substances and therefore do not impair the efficiency of the filter.

Figure 4:
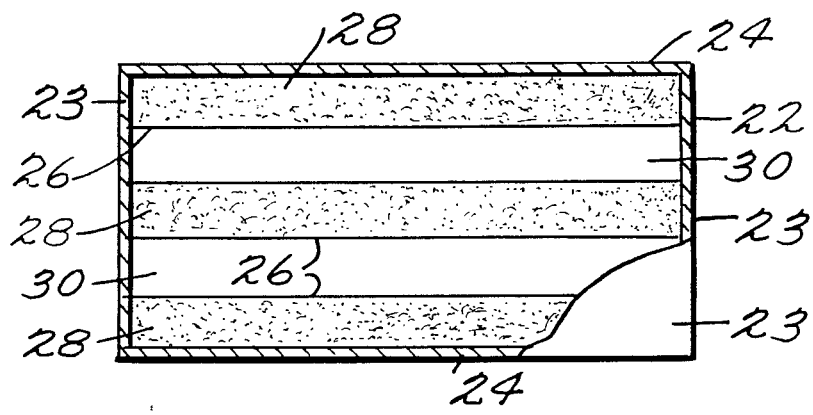
FIG. 4 is a side elevational view partly in section of another embodiment of the filter of the present invention.

As shown in FIG. 4, the filter 10 may take the form of a replaceable cartridge 22 having imperforate side walls 23 and end walls 24 which will allow the passage of the fumes 9 to be filtered. To this end, the end walls 24 may be provided with a large number of perforations or may be made of a screen material. Within the rectangular or box-like cartridge 22 dividing walls 26 will be provided which may be made of a cloth or fabric such as a nylon or synthetic filament web material or, in another embodiment, may be a screen material having a screen mesh sufficient to retain the filtering media 28 in alternate layers therein. Between the layers 28 there will be spaces 30 provided the dimensions of which can be varied depending on the amount of filtering material included in the layers 28. The spaces 30 may simply be occupied by the surrounding atmosphere. Preferably, the filtering material 28 will be charcoal. More specifically, active vegetable charcoal particles are employed which are nearly spherical in shape having, in a preferred embodiment, diameters of approximately 4 millimeters.

Such filtering media is available from CECA ITALIANA of the type specified as AC 40. Also, the supporting layers or walls 26 may be made of a synthetic fiber such as a woven nylon or polyester fiber so as to facilitate quick cleaning with a synthetic detergent when it becomes necessary to replace the carbon filter media.

It can be seen in practice that the automatic dispenser invention completely fulfills the intended objective of drawing down the moisture content of the fumes before they pass through the means of filtering, thus allowing the filter to function effectively, and prevents unpleasant smelling fumes from leaking out of the automatic dispenser.

The maintenance checks are reduced to a periodic cleaning and replacement of the means of filtering, along with the cleaning or replacement of the condensate container.

The automatic fried food dispenser with cooking fumes depurator, embodying the present invention can be modified and varied in numerous ways, all within the scope of the invention as it was conceived; furthermore, all of these details are replaceable with technically equivalent parts.

In practice, the quantity and type of materials used can be chosen according to needs and technology.

I claim;

1. In an automatic dispenser of fried foods of the type having a frier for the food located in an enclosure from which a user may remove the fried food in a container, partition means defining a path for fumes generated by the frier, said path including means for reducing the moisture content of the fumes including a heat exchange means for cooling the fumes, circulation means for causing movement of the fumes along said path, said circulation means being disposed in said path downstream of said means for reducing the moisture content of the fumes, filtering means disposed in said path downstream of said circulation means and downstream of said means for reducing the moisture content of the fumes so that the moisture content of the fumes will be reduced before the fumes pass through said filtering means, said path including an area above said frier.

2. the automatic dispenser as claimed in claim 1, wherein said means of filtering the said fumes comprises a filtering cartridge having a chamber containing an active charcoal filter media.

3. The automatic dispenser as claimed in claim 2, wherein said active charcoal filter is a vegetable charcoal.

4. The invention as claimed in claim 1 wherein said heat exchange means includes a refrigeration circuit including an evaporator disposed in said path.

5. The invention as claimed in claim 1 wherein said path includes a condensate collector disposed vertically below said heat exchange means.

6. The invention as claimed in claim 5 wherein said condensate collector is connected to a removable condensate container disposed within said enclosure.

7. The invention as claimed in claim 1 wherein said circulation means comprises a fan.

8. The invention as claimed in claim 1 wherein said filtering means comprises activated charcoal filter.

9. The invention as claimed in claim 1 wherein said filtering means comprises an electrostatic filter.

10. In an automatic dispenser of fried foods of the type having a frier for the food located in an enclosure from which a user may remove the fried food in a container, partition means defining a path for fumes generated by the frier, said path including means for reducing the moisture content of the fumes including a heat exchange means for cooling the fumes, circulation means for causing movement of the fumes along said path, said circulation means being disposed in said path downstream of said means for reducing the moisture content of the fumes, filtering means disposed in said path downstream of said circulation means and downstream of said heat exchange means so that the moisture content of the fumes will be reduced before passing through said filtering means, said path including an area above said frier, said means for filtering comprising a replaceable filtering cartridge having a chamber containing an active charcoal filter media, said cartridge having walls defining said chamber, said chamber having a plurality of layers therein with some of said layers including said filtering media with alternate ones of said layers being without any filtering media, said layers being divided by walls having interstices for permitting flow of fumes therethrough, said layers of filtering media being spaced from each other and extending substantially parallel to one another and generally transverse to the flow of fumes in said path with said alternate ones of said layers without any filtering media also extending parallel to one another and generally transverse to said path.

11. The automatic dispenser as claimed in claim 10, wherein said walls between said layers are comprised of a fabric.

12. The automatic dispenser as claimed in claim 11, wherein said fabric is comprised of a synthetic textile material.

* * * * *